United States Patent [19]

Shikada

[11] Patent Number: 4,704,741

[45] Date of Patent: Nov. 3, 1987

[54] BIDIRECTIONAL OPTICAL COMMUNICATION SYSTEM

[75] Inventor: Minoru Shikada, Tokyo, Japan

[73] Assignee: NEC Corporation, Tokyo, Japan

[21] Appl. No.: 929,286

[22] Filed: Nov. 12, 1986

[30] Foreign Application Priority Data

Nov. 13, 1985 [JP] Japan .................................. 60-255259

[51] Int. Cl.[4] .............................................. H04B 9/00
[52] U.S. Cl. ................................... 455/606; 455/612; 455/617
[58] Field of Search ............... 455/600, 606, 607, 612, 455/617, 618, 619; 350/96.16

[56] References Cited

PUBLICATIONS

Bachus, et al, "Coherent Optical Fiber Subscriber Line", Technical Digest, vol. III of 5th Int'l Conference on Integrated Optics & Optical Fibre Communication and 11th European Conference on Optical Communication, Venezia, Italy, Oct. 1-4, 1985, pp. 61-64.

Booth, "Integrated Optic Devices for Coherent Transmission", Technical Digest, vol. II, of 5th Int'l Conference on Integrated Optics & Optical Fibre Communication & 11th European Conference on Optical Communication, Venezia, Italy, Oct. 1-4, 1985, pp. 89-96.

Bricheno, et al, "Stable Low-Loss Single-Mode Couplers", Electronics Letters, Mar. 15, 1984, vol. 20, No. 6, pp. 230-232.

Saito, et al, "Optical FSK Heterodyne Detection Experiments Using Semiconductor Laser Transmitter and Local Oscillator", IEEE Journal of Quantum Electronics, vol. QE-17, No. 6, Jun. 1981, pp. 935-941.

Emura, et al, "Novel Optical FSK Heterodyne Single Filter Detection System Using a Directly Modulated DFB-Laser Diode", Electronics Letters, Nov. 22, 1984, vol. 20, No. 24, pp. 1022-1023.

Emura, et al, "Optical DPSk Heterodyne Detection Experiments Using DBR Laser Diodes with External Optical Feedback", Electronics Letters, Nov. 21, 1985, vol. 21, No. 24, pp. 1121-1122.

Primary Examiner—Robert L. Griffin
Assistant Examiner—Leslie Van Beek
Attorney, Agent, or Firm—Schwartz, Jeffery, Schwaab, Mack, Blumenthal & Evans

[57] ABSTRACT

In a bidirectional optical communication system, an optical combiner is included to function not only as a combiner in which receiving signal light and local oscillator light are combined to produce an intermediate frequency signal but also as a divider in which the receiving signal light and transmitting signal light are divided so that parts to be used are decreased in number thereby decreasing the manufacturing cost and size thereof.

5 Claims, 2 Drawing Figures

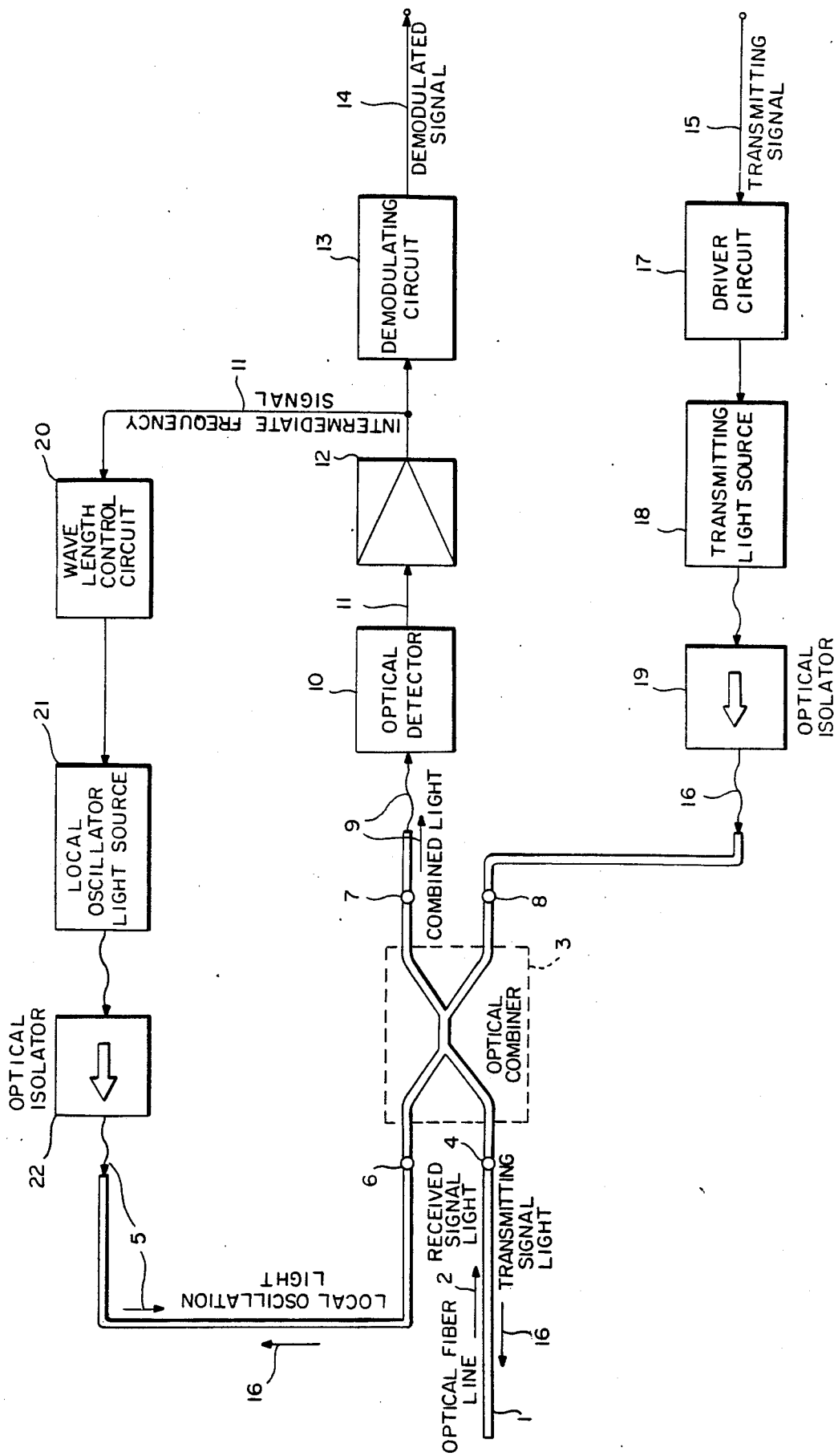

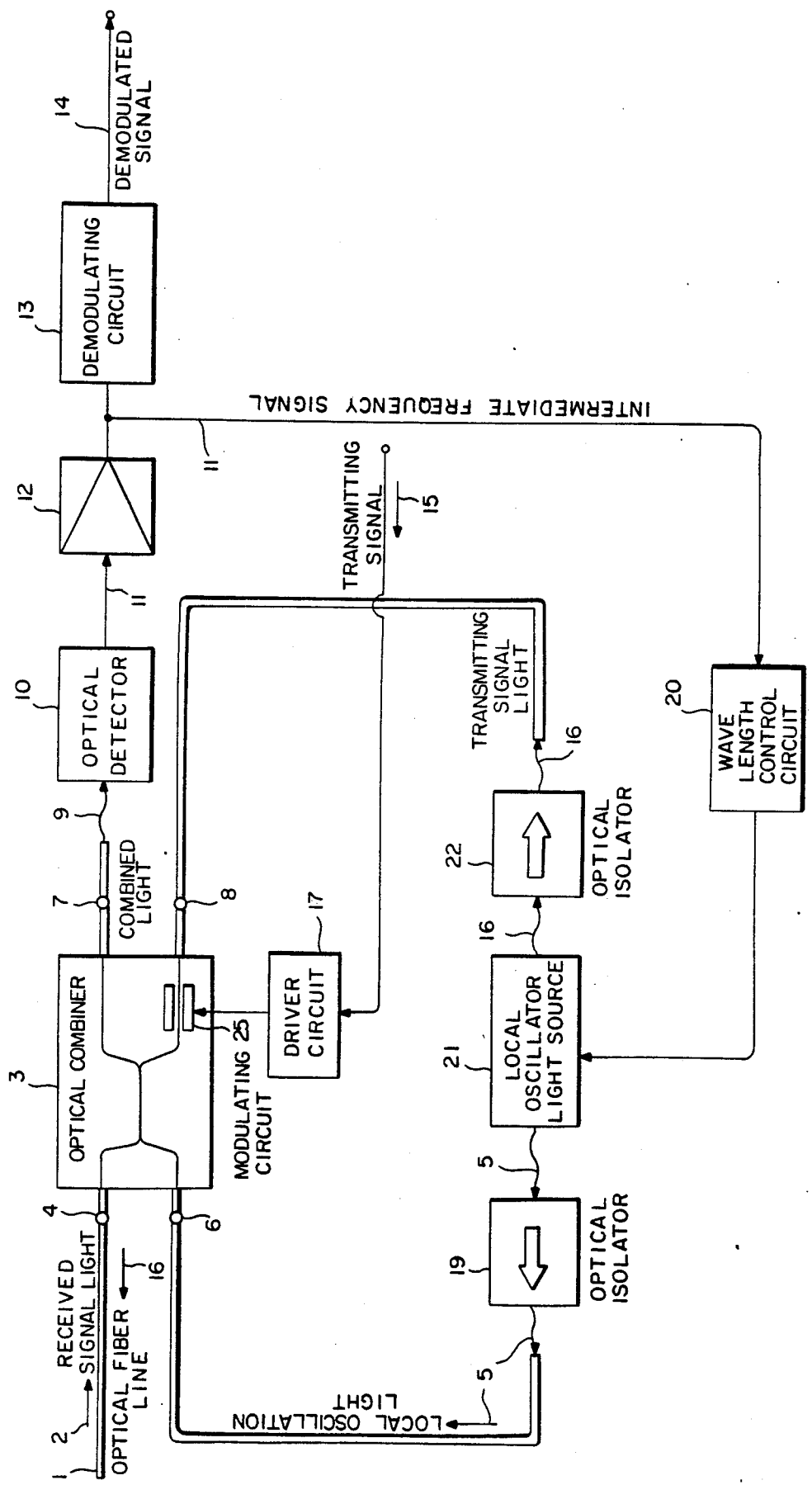

BIDIRECTIONAL OPTICAL COMMUNICATION SYSTEM

FIELD OF THE INVENTION

The invention relates to a bidirectional optical communication system, and more particularly to a bidirectional optical communication system in which parts to be used are decreased in number to result in a decrease of the manufacturing cost and size and simplification of construction.

BACKGROUND OF THE INVENTION

One conventional bidirectional optical communication systems is described in "Technical Digest Volume III of 5th International Conference on Integrated Optics and Optical Fiber Communication and 11th European Conference on Optical Communication" held on Oct. 1 to 4, 1985 in Venezia, Italy. The bidirectional optical communication system comprises a central transmitting and receiving apparatus and a plurality of subscriber's transmitting and receiving apparatus connected through optical fiber line thereto. The central transmitting and receiving apparatus comprises a plurality of transmitters for producing a plurality of transmitting signal lights $f_1$, $f_2$ - respectively, an optical combiner for combining the plurality of the transmitting signal lights $f_1$, $f_2$ - - - , an isolator through which the plurality of the transmitting signal lights $f_1$, $f_2$ - - - pass and in which power of the opposite direction thereto is absorbed, a turnable heterodyne receiver including an optical combiner for combining local oscillator light with signal light to be received from the optical fiber line, and a directional coupler through which the plurality of the optical transmitting signal lights $f_1$, $f_2$ - - - are fed into the optical fiber line and the heterodyne receiver receives the signal light from the optical fiber line. On the other hand, each of the subscriber's transmitting and receiving apparatus is structured in almost the same construction as the central transmitting and receiving apparatus described above except that a single transmitter for producing, for instance, a transmitting signal light f' which is fed through a directional coupler included therein into the optical fiber line is usually provided therein.

In operation, the transmitting signal lights $f_1$, $f_2$ - - - are downstreamed through the optical fiber line from the central transmitting and receiving apparatus while the transmitting signal light f' is upstreamed through the optical fiber line from the subscriber's transmitting and receiving apparatus. In the subscriber's transmitting and receiving apparatus, one of the transmitting signal lights $f_1$, $f_2$ - - - is selected by the tunable heterodyne receiver. The selected signal light is combined with the local oscillator light at the optical combiner included in the tunable heterodyne receiver. The light thus combined is output to an optical detector (photo-detector) to produce an intermediate frequency signal. The intermediate frequency signal is fed into a demodulating circuit to produce a demodulated signal after being amplified. The demodulated signal provides a subscriber with informations from the central transmitting and receiving apparatus.

In the conventional bidirectional optical communication system, however, the tunable heterodyne receiver is provided with the optical combiner in which the received signal light and the local oscillator light are combined to produce the combined light to be output to the optical detector thereby producing the intermediate frequency signal, in addition to the directional coupler through which one of the transmitting signal lights is received from the optical fiber line thereto and such optical parts as a local oscillator light source etc. For this reason, parts to be used in the apparatus inlucing a heterodyne or homodyne receiver are increased in number, and as a result there occurs a disadvantage that the manufacturing cost and volume thereof are increased.

SUMMARY OF THE INVENTION

Accordingly, it is an object of the invention to provide a bidirectional optical communication system in which parts to be used are decreased in number.

It is a further object of the invention to provide a bidirectional optical communication system in which the manufacturing cost thereof is decreased due to the decrease of the parts to be used therein.

It is still a further object of the invention to provide a bidirectional optical communication system in which the volume thereof is decreased due to the decrease of the parts to be used therein.

It is yet a still further object of the invention to provide a bidirectional optical communication system in which the construction thereof is simplified due to the decrease of the parts to be used therein.

According to the invention, a bidirectional optical communication system comprises, means for producing local oscillator light, means for producing demodulated signal in accordance with the combination of signal light received from optical fiber line and said local oscillator light, means for producing transmitting signal light, and optical combiner for performing said combination and for feeding said transmitting signal light into said optical fiber line.

BRIEF DESCRIPTION OF THE DRAWINGS

The invention will be explained in detail in accordance with the following drawings wherein, FIG. 1 is a block diagram showing a bidirectional optical communication system in the first embodiment according to the invention, and FIG. 2 is a block diagram showing a bidirectional optical communication system in the second embodiment according to the invention.

DESCRIPTION OF THE PREFERRED EMBODIMENT

In FIG. 1, there is shown a bidirectional optical communication system according to the invention which comprises an optical fiber line 1 in which signal light 2 to be received is downstream while signal light 16 to be transmitted is upstream, an optical combiner 3 such as an optical directional coupler having four terminals 4, 6, 7 and 8, an optical detector (photo-detector) 10 connected to the terminal 7 of the optical combiner 3 to produce an intermediate frequency signal 11 in accordance with signal light 9 described later in more detail, an amplifier 12 amplifying the intermediate frequency signal 11 up to a predetermined level, a demodulating circuit 13 producing a demodulated signal 14 such as a video signal in accordance with the amplified intermediate frequency signal 11, an optical isolator 19 through which the optical signal 16 to be transmitted is passed and in which signal light 9 is absorbed, a light source 18 which is driven in accordance with transmitting signal 15 by a driver circuit 17 to produce the signal light 16, an optical isolator 22 through which local oscillator light 5 is passed and in which the signal light 16 is absorbed, and a light source 21 which is controlled in accordance with the intermediate frequency signal 11 by a wavelength control circuit 20 to produce the local oscillator light having a predetermined wavelength.

In operation, the signal light 2 which is propagated through the optical fiber line 1 goes into the first terminal 4 of the optical combiner 3 and radiates from the third and fourth terminals 7 and 8 thereof after being combined with the local oscillator light 5 which is fed into the second terminal 6 thereof. The combined light 9 which radiates from the third terminal 7 of the optical combiner 3 goes into the optical detector 10 to be converted into the intermediate frequency signal (electric signal) 11. The intermediate frequency signal 11 is input to the demodulating circuit 13 after being amplified at the amplifier 12 whereby the demodulated receiving signal 14 is obtained.

On the other hand, the transmitting signal light 16 carrying the transmitting signal 15 radiates from the transmitting light source 18 being subject to the modulation of the driver circuit 17 and is fed into the fourth terminal 8 of the optical combiner 3 through the optical isolator 19. In the optical combiner 3, the transmitting signal light 16 is partly branched into the second terminal 6 thereof while the remaining portion thereof radiates from the fourth terminal 4 thereof to propagate through the optical fiber line 1 in the opposite direction to the receiving signal light 2 whereby the central or another subscriber's receiving apparatus may receive the latter transmitting signal light 16.

The local oscillator light 5 is output through the optical isolator 22 from the local oscillator light source 21 to be fed into the second terminals 6 of the optical combiner 3. The local oscillator light source 21 is controlled by the wavelength control circuit 20 so that the center frequency thereof is adjusted to be a predetermined value, for instance, 600 MHz in the embodiment.

In the embodiment described above, the transmitting light source 18 and the local oscillator light source 21 may be composed of a semiconductor laser from which coherent light having a single wavelength radiates.

The receiving signal light 2 is of transmission rate 140 Mb/s and of binary frequency deviation modulating wave the frequency deviation of which is 280 MHz. Likewise, the transmitting signal light 16 is of the same transmission rate and modulating pattern as the receiving signal light 2, and there exists the wavelength difference which is approximately 1 Å between the receiving and transmitting signal lights 2 and 16. This is a well known type of frequency shift keying (FSK) modulation which is described in, for instance, "IEEE Journal of Quantum Electronics, Vol.QE-17, No. 6, June 1981". Alternative to FSK modulation, phase shift keying (PSK) modulation which is described in, for instance, "Electronics Letters 21st Nov. 1985 Vol. 21 No. 24PP. 1121-1122" may be employed.

The optical combiner 3 is of a directional coupler having a branching ratio of approximately 1:1 which is manufactured by steps of placing two optical fibers at adjacent positions, heating and drawing them. This is described in, for instance, "Electronics Letters 15th Mar. 1984 Vol. 20 No. 6".

As clearly understood in the above described embodiment, the optical combiner 3 is provided to function not only as an optical combiner in which the receiving signal light 2 and the local oscillator light 5 are combined but also as a bidirectional divider in which the receiving signal light 2 and the transmitting signal light 16 are divided so that parts to be used are decreased in number thereby decreasing the manufacturing cost and volume of a bidirectional optical communication system.

In FIG. 2, there is shown a bidirectional optical communication system according to the invention in which like reference numerals indicate like parts as explained in FIG. 1. FIG. 2 differs from FIG. 1 in that a local oscillator light source 21 also functions as a transmitting light source, an optical combiner 3 is composed of a waveguide typed directional coupler of lithium niobate ($LiNbO_3$), and a modulator 25 modulating the transmitting signal light 16 is built in the optical combiner 3. The directional coupler of lithium niobate ($LiNbO_3$) is described in, for instance, "Technical Digest Volume II Invited Papers of 15th International Conference on Integrated Optics and Optical Fiber Communication and 11th European Conference on Optical Communication" held on Oct. 1 to 4, 1985 in Venezia, Italy.

In operation, the receiving signal light 2 which is propagated through the optical fiber line 1 goes into the first terminal 4 of the optical combiner 3 and radiates from the third and fourth terminals 7 and 8 thereof after being combined with the local oscillator light 5 which is input into the second terminal 6 thereof in the same manner as mentioned in the first embodiment. The combined light 9 which radiates from the third terminal 7 of the optical combiner 3 is input into the optical detector 10 to be converted into the intermediate frequency signal 11 which is demodulated at the demodulating circuit 13 thereby providing the receiving signal 14.

In addition to the local oscillator light 5, the transmitting signal light 16 radiates from the local oscillator light source 21. That is to say, light output from the back surface of resonator for a semiconductor laser composing the local oscillator light source 21 is utilized as the transmitting signal light 16. For this purpose, the light output is input into the fourth terminal 8 of the optical combiner 3 and is phase-modulated at the waveguide typed modulator 25 mentioned above whereby the modulated transmitting signal light 16 is fed into the optical fiber line 1 in the opposite direction to the receiving signal light 2.

In the embodiment described above, the local oscillator light source 21 is controlled in its wavelength by the wavelength control circuit 20 so that the center frequency of the intermediate frequency signal 11 is to be of 600 MHz. The transmitting and receiving signal lights 2 and 16 are modulated in accordance with binary phase modulation and the transmission rate thereof is 200 Mb/s.

In the invention, various modifications may be made in the first and second embodiments described above. For instance, the transmitting and receiving signal lights 2 and 16 may be modulated differently, that is to say, one by FSK modulation while the other by PSK modulation, one by PSK modulation while the other by AM modulation, one by the optical heterodyne detection while the other by the optical homodyne detection, and one by the optical heterodyne detection while the other by the optical direct detection (only for transmitting signal light 16) are possible to be performed.

Further, although the optical combiner 3 is explained to have four terminals, a plurality of transmitting and receiving apparatus may be provided by use of an optical combiner having more than six terminals.

Although the invention has been described with respect to specific embodiments for complete and clear disclosure, the appended claims are not thus limited but are to be construed as embodying all modifications and alternative constructions that may occur to one skilled in the art which fairly fall within the basic teaching herein set forth.

What is claimed is:

1. A bidirectional optical communication system comprising,
    means for producing local oscillator light,
    means for producing a demodulated signal in accordance with the combination of signal light received from an optical fiber line and said local oscillator light,
    means for producing a transmitting signal light, and
    an optical combiner for performing said combination and for feeding said transmitting signal light into said optical fiber line.

2. A bidirectional optical communication system according to claim 1, wherein said optical combiner comprises a directional coupler having four terminals, said optical fiber line connected to the first of said terminals, said means for producing said local oscillator light connected to the second of said terminals, said means for producing said demodulated signal connected to the third of said terminals, and said means for producing said transmitting signal light connected to the fourth of said terminals.

3. A bidirectional optical communication system according to claim 1,
    wherein said optical combiner comprises a waveguide type bidirectional coupler in incorporating a modulator modulating said transmitting signal light.

4. A bidirectional optical communication system according to claim 1,
    wherein said means for producing said local oscillator light and said means for producing said transmitting signal light share a single light source.

5. A bidirectional optical communication system according to claim 1,
    wherein said means for producing said local oscillator light is controlled in its wavelength in accordance with an intermediate frequency signal produced by said means for producing said demodulated signal.

* * * * *